(12) United States Patent
Carulli (10) Patent No.: US 9,419,938 B2
(45) Date of Patent: Aug. 16, 2016

(54) INTERACTIVE EDUCATIONAL SYSTEM AND METHOD

(71) Applicant: Susan Jean Carulli, Baldwinsville, NY (US)

(72) Inventor: Susan Jean Carulli, Baldwinsville, NY (US)

(*) Notice: Subject to any disclaimer, the term of this patent is extended or adjusted under 35 U.S.C. 154(b) by 208 days.

(21) Appl. No.: 14/017,059

(22) Filed: Sep. 3, 2013

(65) Prior Publication Data

US 2015/0064676 A1 Mar. 5, 2015

(51) Int. Cl.
| | |
|---|---|
| *G09B 5/00* | (2006.01) |
| *H04L 29/12* | (2006.01) |
| *H04L 12/18* | (2006.01) |
| *H04L 29/06* | (2006.01) |
| *H04Q 11/04* | (2006.01) |
| *H04N 7/15* | (2006.01) |

(52) U.S. Cl.
CPC ........ *H04L 61/2503* (2013.01); *H04L 12/1813* (2013.01); *H04L 29/06* (2013.01); *H04L 29/12009* (2013.01); *H04L 29/1233* (2013.01); *H04L 29/12047* (2013.01); *H04L 61/15* (2013.01); *H04L 61/25* (2013.01); *H04L 63/0272* (2013.01); *H04L 63/0428* (2013.01); *H04L 65/1006* (2013.01); *H04L 65/403* (2013.01); *H04L 65/4038* (2013.01); *H04N 7/15* (2013.01); *H04Q 11/04* (2013.01); *H04L 29/06027* (2013.01); *H04L 63/0281* (2013.01); *H04L 63/164* (2013.01); *H04Q 2213/1329* (2013.01); *H04Q 2213/13034* (2013.01); *H04Q 2213/13103* (2013.01); *H04Q 2213/13106* (2013.01); *H04Q 2213/13109* (2013.01); *H04Q 2213/13166* (2013.01); *H04Q 2213/13196* (2013.01); *H04Q 2213/13204* (2013.01); *H04Q 2213/13335* (2013.01); *H04Q 2213/13337* (2013.01); *H04Q 2213/13339* (2013.01); *H04Q 2213/13348* (2013.01); *H04Q 2213/13389* (2013.01); *H04Q 2213/13399* (2013.01)

(58) Field of Classification Search
USPC .......................................................... 434/308
See application file for complete search history.

(56) References Cited

U.S. PATENT DOCUMENTS

| | | | |
|---|---|---|---|
| 5,997,304 A | 12/1999 | Wood | |
| 2005/0112538 A1 | 5/2005 | Pinkins | |
| 2010/0279258 A1 | 11/2010 | Cohen | |
| 2014/0248590 A1 * | 9/2014 | McCormick | 434/157 |

FOREIGN PATENT DOCUMENTS

| | | |
|---|---|---|
| GB | 2112990 | 7/1983 |
| GB | 2351836 | 1/2001 |

* cited by examiner

*Primary Examiner* — Kesha Frisby
(74) *Attorney, Agent, or Firm* — Tracy Jong Law Firm; Tracy P. Jong; Cheng Ning Jong (57) ABSTRACT

A system for associating an action of a user with a message corresponding to the action, where the message is visually displayed on a series of sequentially disposed discrete mats. The message is uttered by the user and the message is verified using a speech analyzer. The system includes at least two mats, each mat having a display, a transmitter, a receiver, and a presence sensor indicating the presence of the user and configured to indicate the intention of the user to add an answer to a composite answer. The system also includes an audio receiver that receives an audio input from the user and an indicator device that indicates whether the mat is a head mat.

5 Claims, 5 Drawing Sheets

INTERACTIVE EDUCATIONAL SYSTEM AND METHOD

BACKGROUND OF THE INVENTION

1. The Field of the Invention

The present invention is directed generally to an interactive educational system and method. More specifically, the present invention is directed to an interactive educational system and method that requires relatively few steps to set up and operate and one which benefits children who are kinesthetic.

2. Background Art

It has been a challenge for educators to provide educational instructions to children who are kinesthetic with conventional teaching tools such as visual aids, audio aids, physical activities or conventional combinations of these tools. Conventionally, only two of these groups tools are tightly combined while the third is loosely coupled with the other two groups, making the tools ineffective. For instance, a picture or image (visual aid) is presented along with a sound (audio aid) describing the image. A user may be urged to confirm an answer (physical activity) associated with the image and the sound. Such confirmation of an answer is done when an answer has already been provided. There lacks a tool to confirm intermediate results (i.e., associate intermediate results with physical activities). Typically the only confirmation available is via a button press to provide a "Yes" or "No" answer. In order for a tool to be effective, the Applicant discovered that the three groups of tools must be tightly coupled not only when results have been obtained but also along the path in achieving the results. Further, it is imperative to automate such a system which combines these groups of tools such that tedious and monotonous activities can be removed and that a user can remain engaged and the educator can give some level of autonomy to the user.

U.S. Pat. No. 5,997,304 to Wood discloses a phonics and reading teaching device which depicts an arrangement of indicia representing letters of the alphabet and their associated phonemes. Selection of individual indicia causes the device to generate an audio signal or other response. The audio signal is generated by an output in the form of a speaker, and a processor is provided for controlling the operation of the device. In one mode of operation, the processor causes the speaker to produce a prompting signal indicating a word, and in response to each sequentially correct selection of a letter in the word, to produce a signal representative of a phoneme associated with the letter. The phoneme produced is dependent on the position of the letter in the word. When all of the letters in the word have been selected in correct order, the processor causes the speaker to produce a signal representing a pronunciation of the word or other affirmative acknowledgement. In another mode of operation, the processor operates in a "Make a word" mode. The processor responds to a selection of a letter by causing the speaker to produce a signal representative of the name or phoneme of the letter, and waits for another letter to be selected. After a predetermined number of letters have been selected, the processor causes the speaker to produce a signal representative of phonemes associated with each of the letters and a signal representative of a pronunciation of the sequence of letters. The Wood disclosure fails to disclose a means for determining the correctness of a vocal answer uttered by a user. As all possible phonemes are provided on one mat, the use of such device involves selections of phonemes (or steps) which are less straightforward to children having kinesthetic learning styles as no sequence of movement has been pre-established in the case of the present invention, mats are sequentially laid out and the sequence of movement is pre-established. The Wood disclosure further lacks the level of automation of the present invention a feature which provides the additional advantage of simplifying the setup and use of the system.

U.S. Pat. Pub. No. 20100279258 of Cohen discloses methods and games for teaching cognitive and social skills to children with alternative learning styles, particularly children with kinesthetic and/or visual learning styles. Mission-oriented exercises are designed to engage hyperactive children to solve problems. Alternative methods of displaying and sequencing data communicate with visual learners, encouraging flexibility of cognitive thought processes. Children are dealt game parts having indicia, such as numbers, letters, or actions. Children configure the parts into linear, curvilinear, radial, or stacked assemblies, producing random, compound permutations of equations to calculate. Children operate the games in a competitive, cooperative social environment. An observer provides feedback. The Cohen disclosure lacks a means for determining the correctness of a vocal answer uttered by a user and the level of automation of the present invention.

U.S. Pat. Pub. No. 20050112538 of Pinkins discloses a talking floor mat learning tool that can be used to teach young children content such as, colors, shapes, numbers, simple math, phonemes, phonics, etc. while affording the learner the opportunity to move and respond by placing his/her foot on the floor mat. The talking floor mat learning tool has content modules which are connected to a battery powered audio box which asks questions, gives responses to answers, gives directions and even gives praises to the learners. However, this disclosure lacks a means for determining the correctness of a vocal answer uttered by a user. As all possible answers are provided on one mat, the use of such device involves selections of answers which involve only routine placement of a user's foot on the mat. Distinguishably, the present invention requires that an answer be provided rather than being selected from a pool of answers.

U.K. Patent Application GB 2351836 of Edwards discloses a child educational and activity/game comprising circular shaped rubber mats which indicate upon them a label (either numerical, alphabetical, shaped or musical annotation) which when jumped upon by the child will produce a confirmation response e.g., audible, vibratory or illuminating. In use, a teacher will give a verbal instruction for a child to jump on a mat bearing a particular symbol and if the child has selected the correct mat an audible or vibratory response is given by the mat. As with the other prior art, this disclosure lacks a means for determining the correctness of a vocal answer uttered by a user. Again, as all possible answers are provided on one mat, the use of such device involves selections of answers which involve only routine placement of a user's foot on the mat.

U.K. Patent Application GB 2112990 of Guha et al. discloses a toy including mat means arranged as a plurality of areas designated by numbers, letters, or the like, and output means such as a musical note generator controllable by the mat means to provide a specific auditory and/or visual output according to the area stepped on. The auditory outputs include musical tones and spoken numbers, letters or words. The visual outputs include displays of numbers, letters, and the like and may be effected by means of a TV receiver or a seven-segment display. This disclosure also lacks a means for determining the correctness of a vocal answer uttered by a user. Again, as all possible answers are provided on one mat, the use of such device involves selections of answers which involve only routine placement of a user's foot on the mat.

Thus, there arises a need for an interactive educational system which combines the use of visual aids, audio aids and physical activities and one which can be easily set up and operated.

SUMMARY OF THE INVENTION

The present invention is directed toward an interactive educational system which enables children who are kinesthetic to acquire information via a combination of physical activities, visual inputs and audio interactions. There is provided a system for associating a user's action with a corresponding message, where the message is visually displayed on at least one sequentially disposed discrete mats. An audio input corresponding to said message is uttered by the user and verified using a speech analyzer. In one embodiment, the system comprises at least two discrete mats, wherein each mat comprises a display for displaying all or part of the message, a transmitter, a receiver, a presence sensor indicating the presence of the user and configured to indicate the intention of the user to add an answer to a composite answer, an audio receiver that receives an audio input from the user, and an indicator device for indicating whether each mat is a head mat. The audio input is verified against the composite answer. If a match exists, such result is indicated. Optimally and additionally, the lack of a match can also be indicated.

The present system can be applied to any type of learning involving interpretation of discrete objects in a sequential manner, for example, the system can be used with letter patterns, numbers, mathematical operands, pictures, etc. The objective is for a user to associate an action, such as stepping on a mat with a letter pattern, number, symbol, etc. Each mat represents a discrete portion of a larger message. A user, upon stepping on a mat, is expected to visually receive and mentally process the discrete portion conveyed by the mat and utter an answer corresponding to the mat.

In one embodiment, the user is expected to utter and verify each discrete portion. In another embodiment, the user is expected to utter and verify an answer representing a combination of discrete portions. In verifying the result, the user's utterance of an answer corresponding to a mat is input into an audio receiver which transmits it to a processor which then compares it to a target answer via voice patterns. If a match occurs, a celebratory action can be taken, e.g., broadcast of recorded claps and/or lighting or blinking of a mat with a special color.

Accordingly, it is a primary object of the present invention to provide an interactive educational system capable of providing feedback to a user by receiving and verifying the user's utterances (audio input) and indicating whether or not the utterances match their respective expected answers.

It is another object of the present invention to provide a system adapted to kinesthetic learning methods and processes.

It is another object of the present invention to provide an interactive educational system having discrete components which can be initialized with relatively few steps.

It is another object of the present invention to provide an interactive educational system having discrete components which can be operated with relatively few steps.

It is another object of the present invention to provide an interactive educational system that can be operated by a child as few steps are required to initialize and operate such system.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—electronic mat
4—transmitter of mat
6—receiver of mat
8—controller of mat
10—memory of controller of mat
12—head mat selector
14—distance between the transmitter-receiver pair of two adjacent mats
16—handheld unit 18—input device of handheld unit
20—controller of handheld unit
22—transmitter of handheld unit
24—display of electronic mat
26—step of selecting a mat as head mat
28—step of broadcasting resident serial code
30—step of responding to broadcast of resident serial code
31—step of transmitting unique identification number to a mat of a particular serial code
32—audio receiver of handheld unit
34—memory of handheld unit
36—display of handheld unit
38—presence sensor
40—contact switch
42—trip lever of contact switch
44—tray
46—cover
48—spring
50—on-off switch
52—accuracy indicator
54—direction which a user is typically oriented
56—mat orientation marker
58—step of comparing received identification number with resident identification number
60—step of parsing a message to harvest data to be displayed and compose new message
62—step of data string to next mat

PARTICULAR ADVANTAGES OF THE INVENTION

The present system is programmable using a handheld unit and removes the need to physically write with a writing device on a mat or physically remove/erase writing from a mat, thereby making the operation of the present system easier and without tight supervision or aid from an individual. As the setup and operation of such system do not involve excessive amounts of labor or supervision, it is suitable for use by a child. The present system is interactive in that answers provided by users of such system are verified. In contrast to conventional answer verification systems where a discrete selection is made when presented with a choice of two or more answers, the present system uses voice pattern matching to determine whether an answer uttered by a user is correct. Such verification system ensures that the user has "learned" a subject matter as the answers themselves are provided directly by the user instead of making a selection from multiple choices as in a conventional system.

The present system forces a user to get physically involved, thereby reinforces learning especially for individuals that are kinesthetic. Further, there exist requirements that associate an action with at least a portion of a message, thereby reinforcing learning for any individuals as a mat representing at least a portion of a message is required to be stepped on such that the mat is considered as part of the "expected" answer for proper verification. The use of discrete mats aids in engaging the interest of a user as the discrete mats present greater challenges for a user when interacting with the system. Such mats mimic those of non-electronic types (i.e., types of mats that are ubiquitous and a user is already familiar with).

All mats of the present system are identical. If a mat is damaged or lost, it can simply be replaced with another identical mat, thereby eliminating the need to re-acquire the entire set of the system.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "message" is used herein to mean an object that is transmitted from a transmitter of one mat and received by the receiver of another mat. When the term "message" is used in conjunction with the setting of a unique identification number in mat, it can contain the unique identification number and the serial code of the mat whose identification number is to be set, a reader signal or a request for receiving mats to responding by broadcasting their serial codes. When the term "message" is used in conjunction with the propagation of a data string through a series of mats, it can contain pieces of data that are to be harvested and used in the series of mats.

The terms "broadcast" and "transmit" are used interchangeably herein. A broadcast message is typically a message not directed to a specific audience/receiver. A transmit message is typically intended for a specific audience/receiver. However, as disclosed herein, in many occasions, a message is broadcast and received by a receiver which determines whether or not the message is intended to be received by the receiver.

The terms "discrete mats" are used herein to mean mats that are not physically linked by either by wires, cables, a substrate layer and the like but otherwise may be functionally connected.

Figure 1:
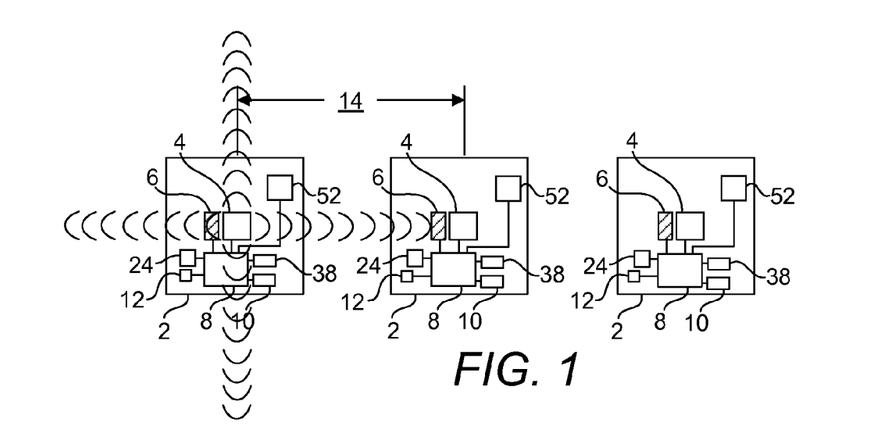
FIG. 1 is a diagram depicting a plurality of sequentially disposed discrete electronic mats according to the present interactive educational system.

FIG. 1 is a diagram depicting a plurality of sequentially disposed discrete electronic mats according to the present interactive educational system. A total of three discrete mats 2 are depicted. Each mat includes a controller 8, a display 24, a transmitter 4, a receiver 6, a memory 10, an indicator device 12 configured for indicating whether each mat is a head mat within the plurality of sequentially disposed discrete mats 2 and a presence sensor 38.

A presence sensor of a mat is configured to indicate whether the mat is being stepped on and the intention of the user to add the currently stepped on mat to consideration when the user's audio input or utterance is compared to a composite answer. For instance, if a user chooses to verify an utterance corresponding to only a portion of the total number the mats, the user may do by comparing his utterance to the composite answer which includes an aggregation of answers up to the point of the last mat stepped on. Therefore, intermediate results may be verified instead of having to wait until the last active mat has been stepped on. An active mat is defined as a mat that is part of a sequentially disposed discrete mat used to display a message. Therefore, a situation can exist that the number of active mats is less than the total number of mats as there can be unused mats. If verification of the portion of a message corresponding to a mat is desired, the user is required to step on a mat and prior to stepping on the next mat, utters an answer into an audio input to be verified using a speech analyzer.

In one embodiment, the transmitter and receiver are radio frequency based devices. The transmitter and receiver may also be based on another device as long as transmission from the transmitter is directionless as the direction in which a transmission is targeted is not known. In one embodiment, the indicator device is a switch. In one embodiment, the present mat further includes an accuracy indicator 52, e.g., an output device such as a light emitting device for indicating the correctness of a user's answers via a celebratory type of action. In one embodiment, an accuracy indicator, e.g., a lamp is programmed to blink or illuminate with a special color or recorded claps are broadcast when the user's answer is deemed correct. e.g., broadcast of recorded claps and/or lighting or blinking of a mat with a special color.

In one embodiment, the display is an active electronic panel, e.g., Liquid Crystal Display (LCD) or Light Emitting Diode (LED). In another embodiment, the display is a passive electronic panel, e.g., electronic paper. An example of a suitable electronic paper is disclosed in U.S. Pat. No. 8,254,016, whereby the disclosure of which is incorporated by reference herein. The display is preferably suitably durable to withstand repeated impact and both dynamic and static weight due to a user stepping on it and remaining on it. In one embodiment, a clear protective layer is overlaid atop the display to isolate the display from direct contact with the user and/or to bear the weight of the user from being directly supported by the display. In one aspect, two consecutive mats 2 are disposed at a distance 14 suitable for a user. For instance, the distance 14 may be configured for the length of a user's stride. Each controller and its peripheral devices are preferably powered by an on-board power source, thereby making each mat completely mobile.

Figures 2, 3:
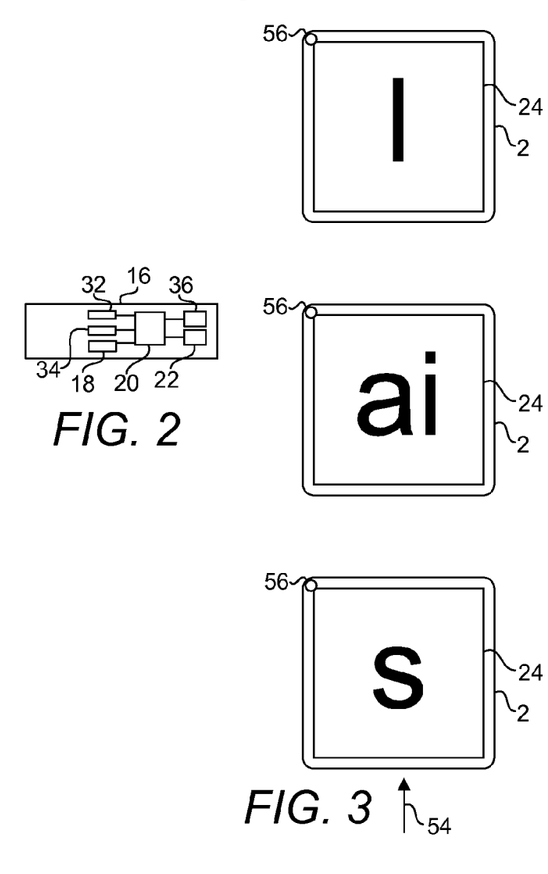
FIG. 2 is a diagram depicting a handheld unit according to the present interactive educational system.
FIG. 3 is a top view of a plurality of electronic mats, depicting an example of the use of a plurality of electronic mats arranged in series to sequentially display components of a word.

FIG. 2 is a diagram depicting a handheld unit according to the present interactive educational system. The handheld unit 16 includes a controller 20 configured to initiate identification of the plurality of sequentially disposed discrete mats 2, an input device 18, for receiving messages from a user which can then be communicated via a transmitter 22 to the plurality of sequentially disposed discrete mats 2 wirelessly, a display 36 for showing a status of messages received in the handheld unit 16 from a user, an audio receiver 32, e.g., microphone, for receiving an audio input from the user, a memory 34 for caching inputs from the user. In one embodiment, the handheld unit is a purpose built device. Alternatively, the handheld unit 16 can be a smartphone, Personal Digital Assistant (PDA), electronic pad and the like, provided these devices are equipped with the tools to wireless communicate with another device and where such communication is direction agnostic.

FIG. 3 is a top view of a plurality of the present electronic mats, depicting an example of the use of a plurality of electronic mats arranged in series to sequentially display components of a word. In this example, the word being displayed is "sail" and made up of its syllables, "s," "ai" and "l." In addition, numbers, arithmetic, pictures or their combinations thereof may also be used. For example, the expression "5," "+," "12," "=" and "17" may also be used. It shall be noted the orientation in which a syllable is displayed on a mat is also important. In one embodiment as shown, a marker 56 disposed on a corner of each mat 2 aids a user in orientating the mats 2. When laying down the series of discrete mats, a user shall take care to align the mats such that they are aligned with the corners having the markers 56 disposed in a similar fashion. In using a series of discrete mats shown in FIG. 3, a user typically orients himself/herself in a direction substantially parallel to the series of discrete mats (direction 54) and faces the heat mat, i.e., the mat displaying "s" in this case.

Figure 3A:
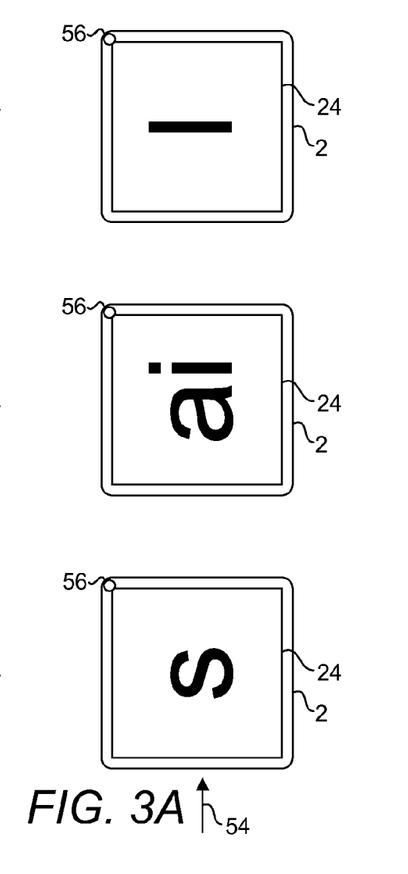
FIG. 3A is a top view of a plurality of electronic mats, depicting another example of the use of a plurality of electronic mats arranged in series to sequentially display components of a word.

FIG. 3A is a top view of a plurality of the present electronic mats, depicting another example of the use of a plurality of electronic mats arranged in series to sequentially display components of a word. In this example, each syllable is now displayed at an orientation that is at about right angle from the orientation shown in FIG. 3. It shall be apparent that, if so chosen, each syllable may also be displayed in other orientations as well.

Figure 4:
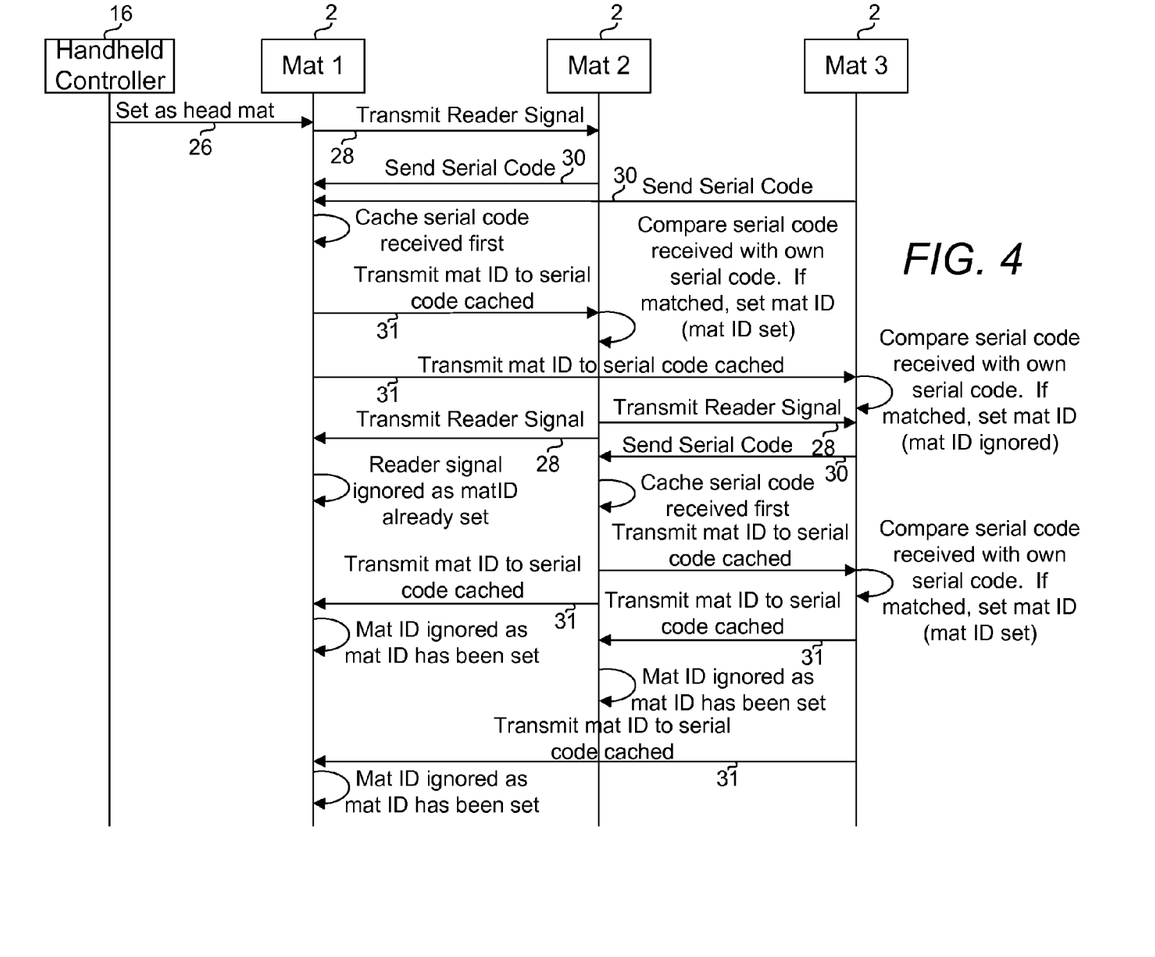
FIG. 4 is a sequence diagram depicting a means by which a plurality of mats is sequentially identified and assigned a sequential position within a series of mats.

FIG. 4 is a sequence diagram depicting a means by which a plurality of discrete mats is sequentially identified and assigned a sequential position within a series of mats during the setup process of the series of mats. Each of the plurality of sequentially disposed discrete mats 1, 2 and 3 in this example is to be assigned a unique identification number. Mats 1, 2 and 3 are physically disposed in the order which the mats are labeled, i.e., mat 1 is the head mat and it is adjacent to mat 2 but mat 1 is not disposed adjacent mat 3. First, a head mat is selected 26 from the plurality of sequentially disposed discrete mats 2. As disclosed elsewhere herein, a head mat selector 12 is used to indicate the head mat. Only one head mat shall be selected. As each mat is capable of being made a head mat, the loss of one or more mats due to misplacement or being out of service does not necessarily halt the use of the remainder of the mats provided there is a sufficiently large number of mats to encompass all portions of a message displayed. Contrary to a set of conventional uniquely configured mats, the present mats are interchangeable in their order in a series as long as they are properly initialized.

Referring back to FIG. 1, the spacing between two adjacent mats in a series is adjustable according to a user's preference. With a head mat designated, an order of the sequentially disposed discrete mats 2 can now be established starting from the head mat to the last mat whose identity is to be established. The head mat then broadcasts 28 a request via its transmitter 4, wherein the broadcaster, i.e., the head mat, includes a resident serial code. Such broadcast is configured to be received via a receiver 6 by any one of or all mats disposed within the sphere of influence within the broadcast. Upon detecting the broadcast, a mat responds 30 with a message indicating its own serial code. The broadcaster, i.e., head mat then receives such message. As there can be more than one mat which responds to the broadcast, it is necessary that the head mat selects one from an adjacent mat. In a preferred embodiment, the message received first is treated as originating from the closest mat as the time of flight for such message to be detected is the shortest. Upon determining the serial code of the closest mat, the head mat is now ready to set the closest mat downstream from the head mat with a unique identification number. A serial code is any code that is factory set or saved during the manufacturing of the mat and should be unique among the mats used in a series. A unique identification number is one which identifies the order of a mat in relation to other mats in a series of mats and is only valid while a mat is powered. The unique identification number can be altered indefinitely each time a mat is re-powered as long as the setting message specifies the exact serial code destined for the respective mat. The head mat then proceeds to broadcast a unique identification number that indicates the position of its recipient being adjacent the sender, i.e., the head mat.

Upon receiving a message in a receiving mat, the serial code associated with the message is compared to the resident serial code of the receiving mat. If the serial code matches the resident serial code, the message is said to be destined for the receiving mat. If the message is destined for the receiving mat, the message is parsed such that a unique identification number is obtained. This unique identification number is cached and adopted as the unique identification number of the receiving mat. After the unique identification number of the receiving mat (mat 2) has been set, this mat is in turn responsible for setting the unique identification number of the mat downstream from it. In the preferred embodiment depicted above, the head mat is a specifically designated mat such that the user does not need to be concerned with a unique physical arrangement between a handheld unit 16 and a mat with which it communicates. In an embodiment not shown, the handheld unit 16 can alternatively act as simply another mat such that the assignment of a unique identification number can occur as if the handheld is the head mat. The latter requires that the handheld unit be held at a distance closest to the head mat such that it passes a message to the correct mat. A physical switch 12 eliminates confusions that can potentially arise due to improper designation of the head mat.

Figure 5:
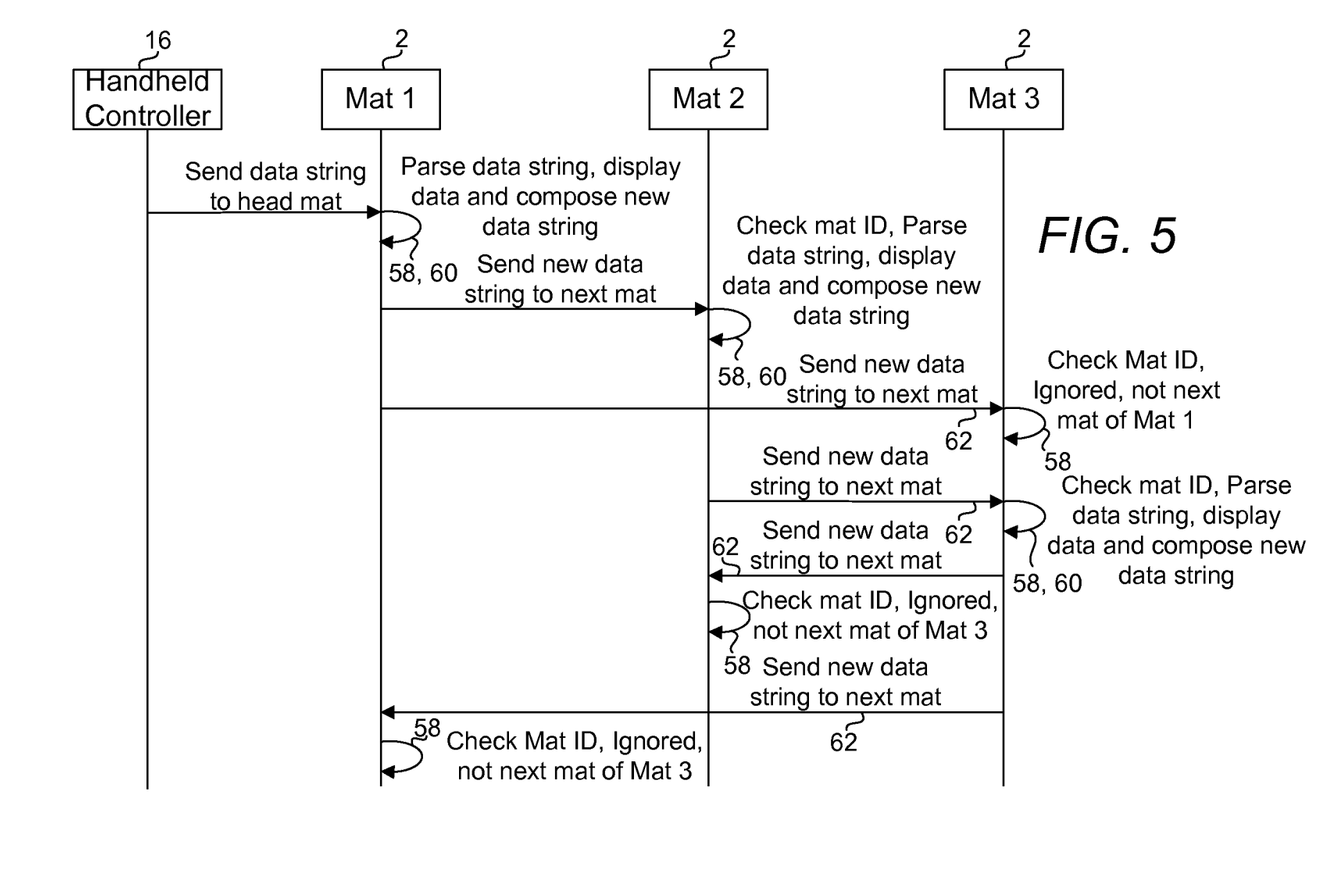
FIG. 5 is a sequence diagram depicting a means by which a plurality of mats is sequentially assigned a display value.

FIG. 5 is a sequence diagram depicting a means by which a plurality of mats is sequentially assigned a display value during the operation of a session of the present system. A user first enters at least one message to be displayed on the plurality of sequentially disposed discrete mats via an input device 18 of the handheld unit 16. A message is propagated to a plurality of sequentially disposed discrete mats according to the previously established order as shown in FIG. 4. Upon receipt of a message from a handheld unit 16, the head mat parses the message such that a portion of the message that is destined for the head mat is harvested and cached. Similar to the means by which the handheld unit is used to set the unique identification numbers of the plurality of mats, a message containing data to be displayed on a mat is also communicated to a series of mats via a head mat. Again, an alternative means for propagating a message is to treat the handheld unit as the head mat and every one in the series of mats as a regular mat, i.e., non-head mat. Upon harvesting a portion of a message, the controller 8 proceeds to compose a new message in the receiving mat (head mat) where the new message contains no information for the receiving mat as such information has already been assigned to the receiving mat. The receiving mat now becomes a setting mat as it continues to propagate the message from the handheld unit 16 by sending (step 62) the newly composed message to the adjacent mat disposed downstream from it. The receiving mat which has just now received the data then determines whether the data is destined for it by comparing its unique identification number with the identification number just received. In one embodiment, the unique identification number is embedded in the header of a message, thereby providing a means for determining a message is meant for a receiving mat. If the received identification number matches the resident identification number of a mat as a result of a comparison performed in step 58, the message is parsed (step 60) such that the data destined for the receiving mat can be obtained and a new message can be composed. In another embodiment, the unique identification number is embedded in the body of a message, necessitating the determination of whether a message is destined for a mat by having to parse the portion of the message containing this unique identification number. In the latter case, the message is required to be parsed in order to obtain the received identification number. This new message is to be sent to a receiving mat with an identification number indicating a mat disposed downstream from the sending mat. The data is now ready to be sent to a display of the mat. The process of sending a new message from a mat which has obtained data to be displayed and receiving/parsing the new message is repeated until there is no data left to be displayed. Therefore, there can be a case where the total number of mats exceeds the number of mats used. Conversely, there can be a case where the number of mats used exceeds the total number of mats. Preferably, a user is informed of the number of mats required to display a message or the user is given the choice of choosing from messages which will fit the number of mats specified. For instance, a word having four syllables such as ceremony or "ce" "re" "mo" "ny" requires at least four mats to fully display the entire word. For the freedom to use a wide range of messages and wide range of lengths of messages, a user can choose to use as many mats as possible.

Figure 6:
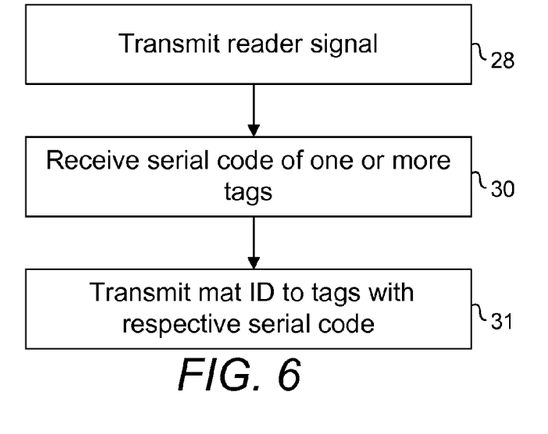
FIG. 6 is a flowchart summarizing the steps taken by a setting mat in setting the unique identification number in a downstream adjacent mat.

FIG. 6 is a flowchart summarizing the steps taken in a setting mat in setting the unique identification number in a downstream adjacent mat. First, a reader signal is broadcast from a setting mat (step 28). In response, those neighboring mats positioned within the influence of the broadcast and whose identification number has not been set, is configured to receive the reader signal (step 30). As there can be more than one neighboring mat which responds to the broadcast, the setting mat needs to determine which mat, among the responding mats is an adjacently disposed downstream mat. In one embodiment, such determination is made by selecting the mat which responds most promptly, indicating the shortest distance of travel for such response and hence the closest this responding mat is to the setting mat. Upon identifying the serial code of the adjacent mat, the setting mat broadcasts a message containing such serial code (step 31) and a unique identification number. The receiving mat having the serial code then receives the message and parses the message for the unique identification number. The receiving mat is now ready to serve as a setting mat as its own unique identification number has been set.

In another embodiment, and in an effort to provide redundancies in setting the order of a plurality of sequentially disposed discrete mats, a means for manually setting the identification number of a mat is provided. For example, the output of a Dual In-line Package (DIP) switch is fed into a controller 8 such that the user may select an identification number manually. As another example, a resident identification number of a mat is simply overwritten with a number received via an input device of a handheld unit and communicated to the mat via transmitter 22 and receiver 6.

Figure 7:
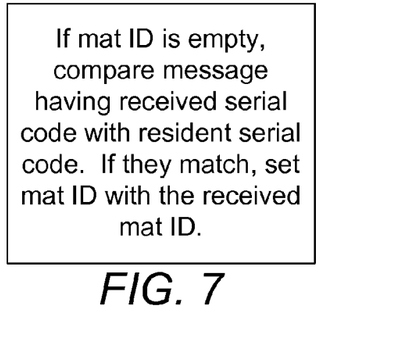
FIG. 7 summarizes the decision made in setting the unique identification number of a receiving mat after a setting mat has queried a downstream adjacent receiving mat and its neighboring mats.

FIG. 7 summarizes the decision made in setting the unique identification number of a downstream adjacent receiving mat after the setting mat has queried the receiving mat and its neighboring mats. If a mat's unique identification number has not been set, the serial code contained in the message is verified. If the received serial code matches the resident code of the receiving mat, the unique identification number contained in the message is adopted as its resident identification number. If the received serial code does not match the resident code, the message is ignored.

Figure 8:
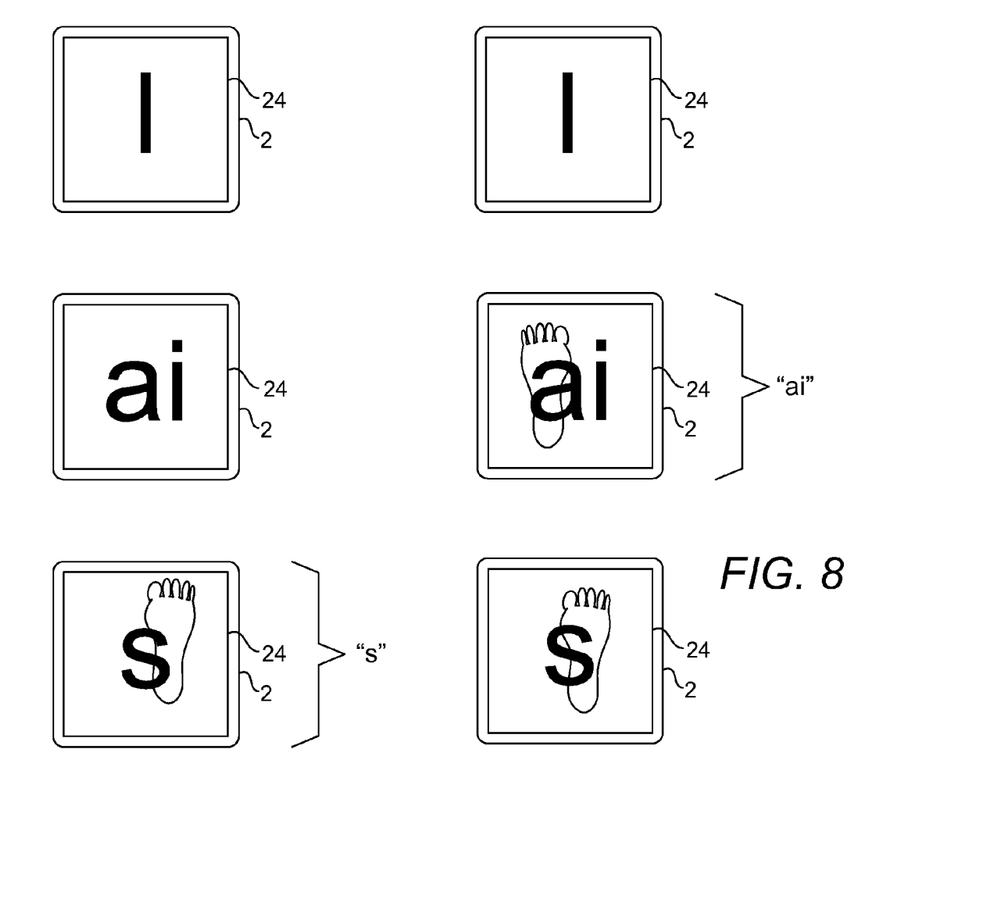
FIG. 8 is a set of diagrams depicting a mode used in verifying a user's answers based on the example of FIG. 3.
Figure 9:
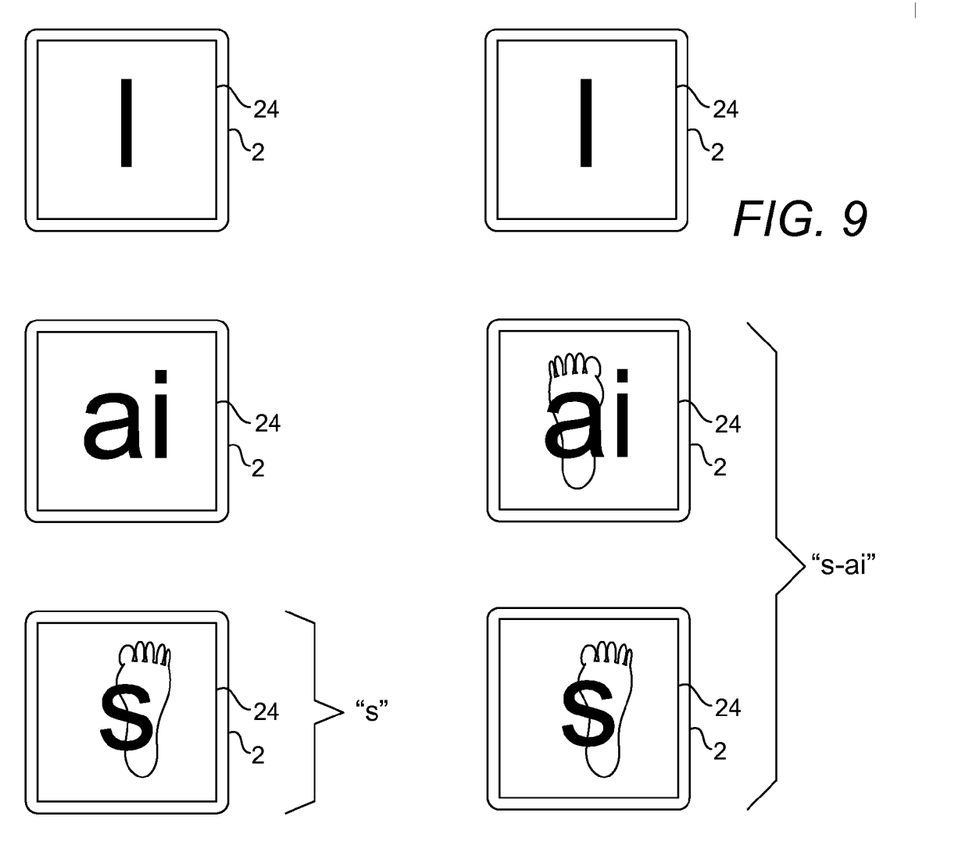
FIG. 9 is a set of diagrams depicting another mode used in verifying a user's answers based on the example of FIG. 3.

FIGS. 8 and 9 are sets of diagrams depicting two different modes used in verifying a user's answers based on the example of FIG. 3. In FIG. 8, there are two diagrams, with the left diagram depicting a scenario where a user has stepped on the mat bearing the letter "s" and the right diagram depicting a scenario where a user has stepped on the two mats bearing the letter "s" and letters "ai." A signal corresponding to the presence of a user on a mat is immediately communicated from the mat to the handheld unit such that a suitable expected answer may be composed. Upon stepping on the mat bearing the letter "s," the user is expected to utter a sound corresponding to the letter "s." Upon stepping on the mat bearing the letters "ai," the user is expected to utter a sound corresponding to the letters "ai." In this mode, a sound corresponding to the letter/s of an individual mat is expected.

FIG. 9 also depicts two diagrams. Again, the left diagram depicts a scenario where a user has stepped on the mat bearing the letter "s" and the right diagram depicting a scenario where a user has stepped on the two mats bearing the letter "s" and letters "ai." Upon stepping on the mat bearing the letter "s," the user is expected to utter a sound corresponding to the letter "s." However, upon stepping on the mat bearing the letter "ai," the user is expected to utter a composite sound corresponding to the letters "ai" in combination with the letter of the mat previously stepped on, i.e., "s." Therefore, the mode of FIG. 9 expects a cumulative or composite answer while the mode of FIG. 8 expects discrete answers for only the individual mats being stepped on.

In yet another mode, a combination of these modes may be implemented. For instance, discrete answers may be expected for all mats except the last mat used. As an example, upon stepping on the mat bearing the letter "s," the expected answer is a sound corresponding to the letter "s" and upon stepping on the mat bearing the letter "ai," the expected answer is a sound corresponding to the letters "ai." However, upon stepping on the mat bearing the letter "l," the expected answer becomes "s-ai-l" as this mat is the last mat for the word "sail." Utterances of a user may be recorded and retained in the memory 34 of the handheld unit for playback at a later time. Results of comparisons of a user's utterances and expected answers may also be retained in the memory 34. The data saved in the memory 34 may be downloaded to another device, e.g., a computer, etc. for review at a later time.

Figure 10:
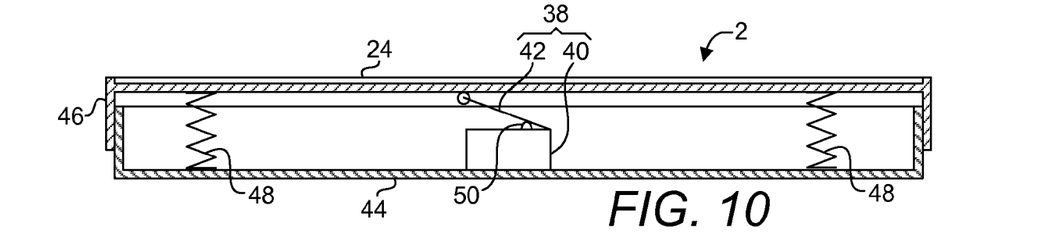
FIG. 10 is a partial cross-sectional view of one embodiment of the present mat depicting a presence sensor in its non-tripped state.
Figure 11:
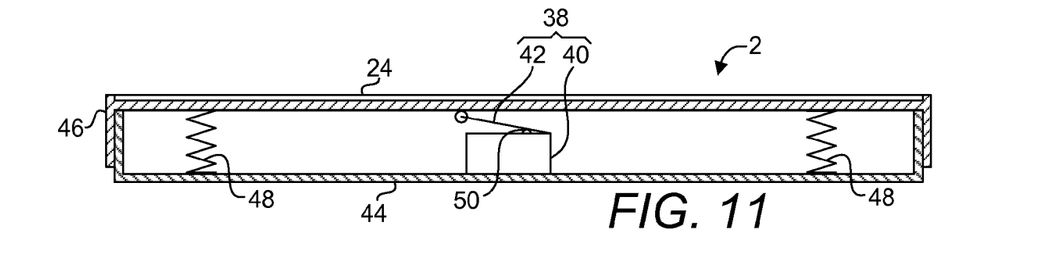
FIG. 11 is a partial cross-sectional view of one embodiment of the present mat depicting a presence sensor in its tripped state.

FIGS. 10 and 11 are partial cross-sectional views of one embodiment of the present mat depicting a presence sensor 38 in its non-tripped and tripped state, respectively. In the embodiment shown in FIGS. 10 and 11, the mat 2 is constructed essentially from a tray 44 and an opposingly disposed cover 46 which is configured to slide vertically relative to the tray 44. The distance between the tray 44 and the cover 46 is maintained by at least one spring 48. A contact switch 40 is disposed such that its trip lever 42 is disposed at a limit of its travel with an on-off switch 50 un-depressed. When the mat 2 is stepped on, as shown in FIG. 11, the cover 46 is lowered, compressing the springs 48 and its travel is eventually stopped by the upper edge of tray 44. The trip lever 42 is rotated such that it comes in contact with or depresses the on-off switch 50, indicating that the mat 2 is being stepped on. Alternatively, a weight sensor or a tactile sensor may be used as a presence sensor.

I claim:

1. A method for displaying a message on a plurality of sequentially disposed discrete mats using a computing device, wherein each of said plurality of sequentially disposed discrete mats is to be assigned a unique identification number, said method is performed by a processor of said computing device in a series of steps comprising:
   (a) selecting a head mat from said plurality of sequentially disposed discrete mats, wherein said selecting step comprises setting the state of a switch to indicate said one and only one of said plurality of sequentially disposed discrete mats is the head mat;
   (b) establishing an order of said sequentially disposed discrete mats, wherein said establishing step comprises:
      (i) causing said selected mat to be a broadcaster to broadcast a request comprising a resident serial code of said broadcaster;
      (ii) causing at least one of said plurality of sequentially disposed discrete mats to respond to said request with a response indicating a serial code of said at least one of said plurality of sequentially disposed discrete mats;
      (iii) receiving at least one response of said at least one of said plurality of sequentially disposed discrete mats by said broadcaster;
      (iv) selecting one of said at least one response;
      (v) broadcasting, by said broadcaster:
         a setting message having a new mat identification number that is sequential to a unique identification number of said broadcaster; and
         said serial code; and
      (vi) receiving said setting message by at least one of said plurality of sequentially disposed discrete mats, wherein if said serial code matches said resident serial code, said new mat identification number is set as the identification number of said at least one of said plurality of sequentially disposed discrete mats,
   (c) propagating the message to said plurality of sequentially disposed discrete mats according to said order, wherein said propagating step comprises:
      (i) transmitting at least a portion of said message with a recipient mat identification number by at least one of said plurality of sequentially disposed discrete mats;
      (ii) receiving said at least a portion of said message by at least one of the other one of said plurality of sequentially disposed discrete mats;
      (iii) comparing said recipient mat identification number to said unique identification number, if said recipient mat identification matches said unique identification number, said at least a portion of said message is parsed to result in a target display message for said recipient mat identification number and a new data string; and
      (iv) repeating steps (c)(i)-(c)(iii) until said new data string is empty; and
   (d) displaying said message on at least one of said plurality of sequentially disposed discrete mats.

2. The method of claim 1, further comprising:
   (a) receiving a presence indication;
   (b) receiving an audio input; and
   (c) comparing said audio input to a standard answer corresponding to said at least a portion of said message to produce a result, wherein if a match exists, an indication that said audio input is correct is provided and if a match does not exist, an indication that said audio input is incorrect is provided.

3. The method of claim 1, further comprising initiating said steps (b) and (c) with a controller wirelessly.

4. The method of claim 1, wherein said selecting step comprises selecting the first response from at least one response of said at least one of said plurality of sequentially disposed discrete mats.

5. The method of claim 1, wherein said message is selected from the group consisting of a word, a number, a mathematical operand, a picture and a combination thereof.

* * * * *